(12) United States Patent
Chien et al.

(10) Patent No.: US 7,265,972 B2
(45) Date of Patent: Sep. 4, 2007

(54) FIXING MECHANISM FOR FIXING A DISC DRIVE AND A LOCKING DEVICE THEREOF

(75) Inventors: Cheng-Hsuen Chien, Taipei (TW); Yung-Lung Liu, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 15 days.

(21) Appl. No.: 11/244,375

(22) Filed: Oct. 6, 2005

(65) Prior Publication Data
US 2007/0081305 A1    Apr. 12, 2007

(51) Int. Cl.
*G06F 1/16* (2006.01)
(52) U.S. Cl. ........... 361/685; 312/223.3; 360/97.01
(58) Field of Classification Search .. 312/223.1–223.6; 369/75.1; 70/38 A, 38 C; 360/97.01, 98.01; 361/679–687, 724–727
See application file for complete search history.

(56) References Cited

U.S. PATENT DOCUMENTS 5,933,321 A * 8/1999 Ruch et al. ............... 361/686
6,327,151 B1 * 12/2001 Chen et al. ............... 361/726
6,885,551 B2 * 4/2005 Chen ........................ 361/685

* cited by examiner

Primary Examiner—Hung Van Duong
(74) Attorney, Agent, or Firm—Rabin & Berdo, P.C.

(57) ABSTRACT

A fixing mechanism for fixing a disc drive and a locking device thereof solves the inconvenience involved in fixing and disassembling the disc drive. The disc drive has at least one a pair of protrusions located at side walls of the disc drive. The fixing mechanism includes a fixing frame and a locking device. The fixing frame has a pair of assembling walls and at least one receiving space is used for receiving the disc drive. One of the assembling walls has a pair of assembling boards protruding outward and an open sliding slot. The protrusions are slidably installed in the sliding slot. The locking device includes a base part and a locking arm. Two sides of the base part are assembled to the assembling boards. A locking hole formed at the free end of the locking arm correspondingly locks one of the protrusions of the disc drive.

20 Claims, 9 Drawing Sheets

FIXING MECHANISM FOR FIXING A DISC DRIVE AND A LOCKING DEVICE THEREOF

BACKGROUND OF THE INVENTION

1. Field of the Invention

The present invention relates to a fixing mechanism for fixing a disc drive and a locking device thereof used for fixing a disc drive onto a host housing of computer, and particularly to a fixing mechanism for fixing a disc drive and a locking device does not require tools or screws.

2. Description of the Related Art

To fix a disc drive onto to a host housing of computer, the prior art usually locks the disc drive onto a disc drive frame in the host housing via screws. However, the space of the host housing located at the two sides of the disc drive is small and disassembling the disc drive from the host housing is inconvenient. In the prior art a step of locking screws in the fixing process needs to be taken and this requires a screwdriver. The assembling and disassembling process is time-consuming and troublesome and the screws are easily lost. Furthermore, if the screws are dropped on the motherboard and are not removed, the motherboard will short when the computer is turned on. Therefore, the computer will be damaged.

SUMMARY OF THE INVENTION

The present invention provides a fixing mechanism, which benefits a user to fix and disassemble the disc drive without a requirement of any tools and drews, and the time for disassembling and fixing the disc drive is reduced. Moreover, the present invention utilizes a clipping force produced from the flexibility of a plastic element to fix the disc drive, and utilizing a characteristic of the plastic elements being produced on a large scale easily to reduce the cost.

The present invention provides a fixing mechanism for fixing a disc drive used for fixing the disc drive onto a host housing of computer. The disc drive has a pair of side walls and at least one pair of protrusions located at one of the side walls. The fixing mechanism for a disc drive includes a fixing frame fixed in the host housing and a locking device. The fixing frame has a pair of assembling walls that are opposite each other. At least one receiving space is formed between the assembling walls for receiving the disc drive. One of the assembling walls has a pair of assembling boards that protrude outward and an open sliding slot formed between the assembling boards. The disc drive's protrusions are slidably installed in the sliding slot and exposed out of the assembling walls. The locking device has a base part and a locking arm that is extended from the base part. The two sides of the base part are assembled to the pair of assembling boards. A locking hole formed at the free end of the locking arm correspondingly locks one of the disc drive's protrusions.

The present invention provides a locking device used for a fixing mechanism for a disc drive. The locking device locks a disc drive in a fixing frame. The locking device includes a base part and a locking arm. The base part is fixed onto the fixing frame. The locking arm is extended from the base part. A locking hole formed at one free end of the locking arm is used for locking the disc drive.

For further understanding of the invention, reference is made to the following detailed description illustrating the embodiments and examples of the invention. The description is only for illustrating the invention and is not intended to be considered limiting of the scope of the claim.

BRIEF DESCRIPTION OF THE DRAWINGS

The drawings included herein provide a further understanding of the invention. A brief introduction of the drawings is as follows.

DETAILED DESCRIPTION OF THE PREFERRED EMBODIMENTS

Figure 1:
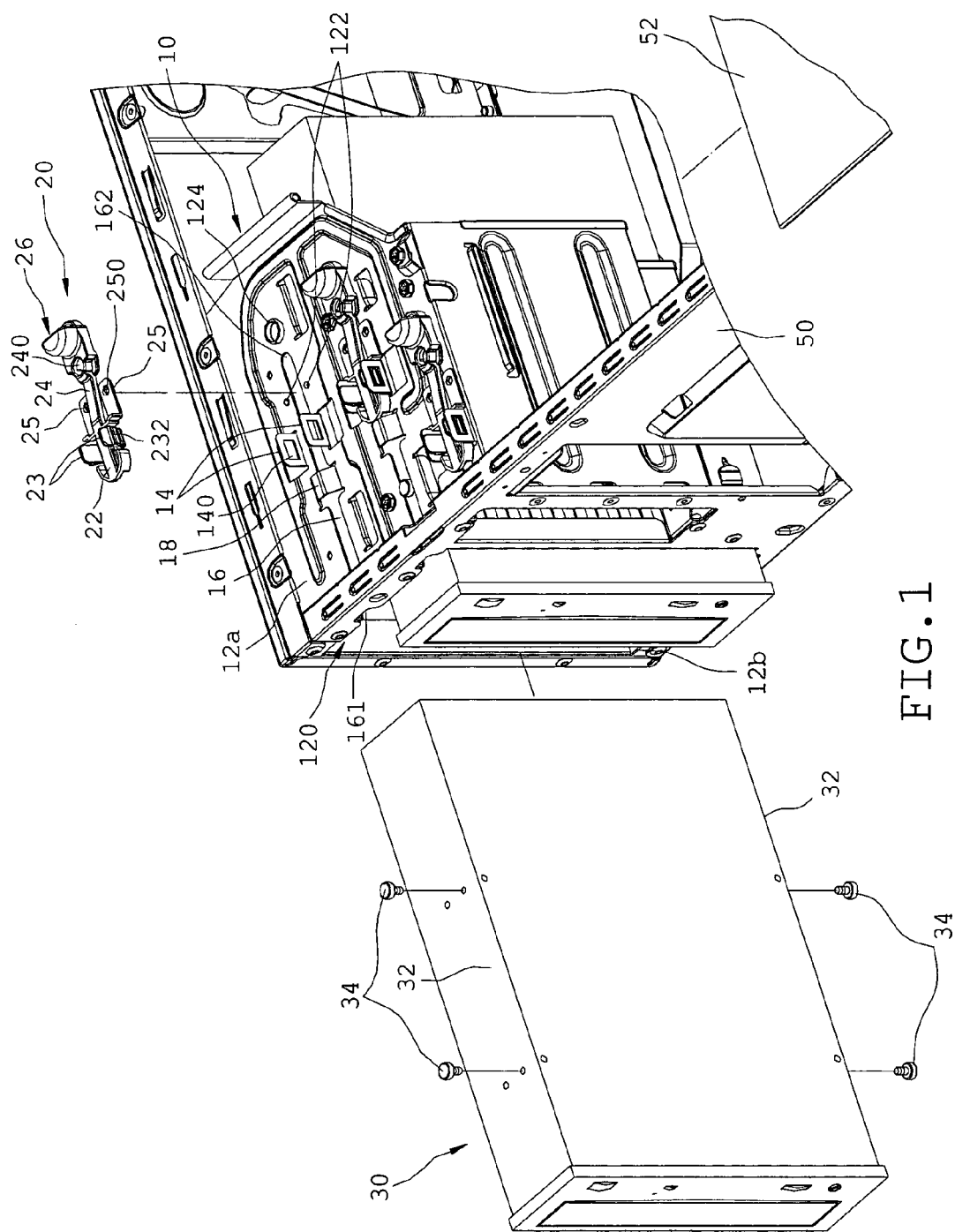
FIG. 1 is an exploded perspective view of a first embodiment of a fixing mechanism for fixing a disc drive of the present invention.
Figure 2:
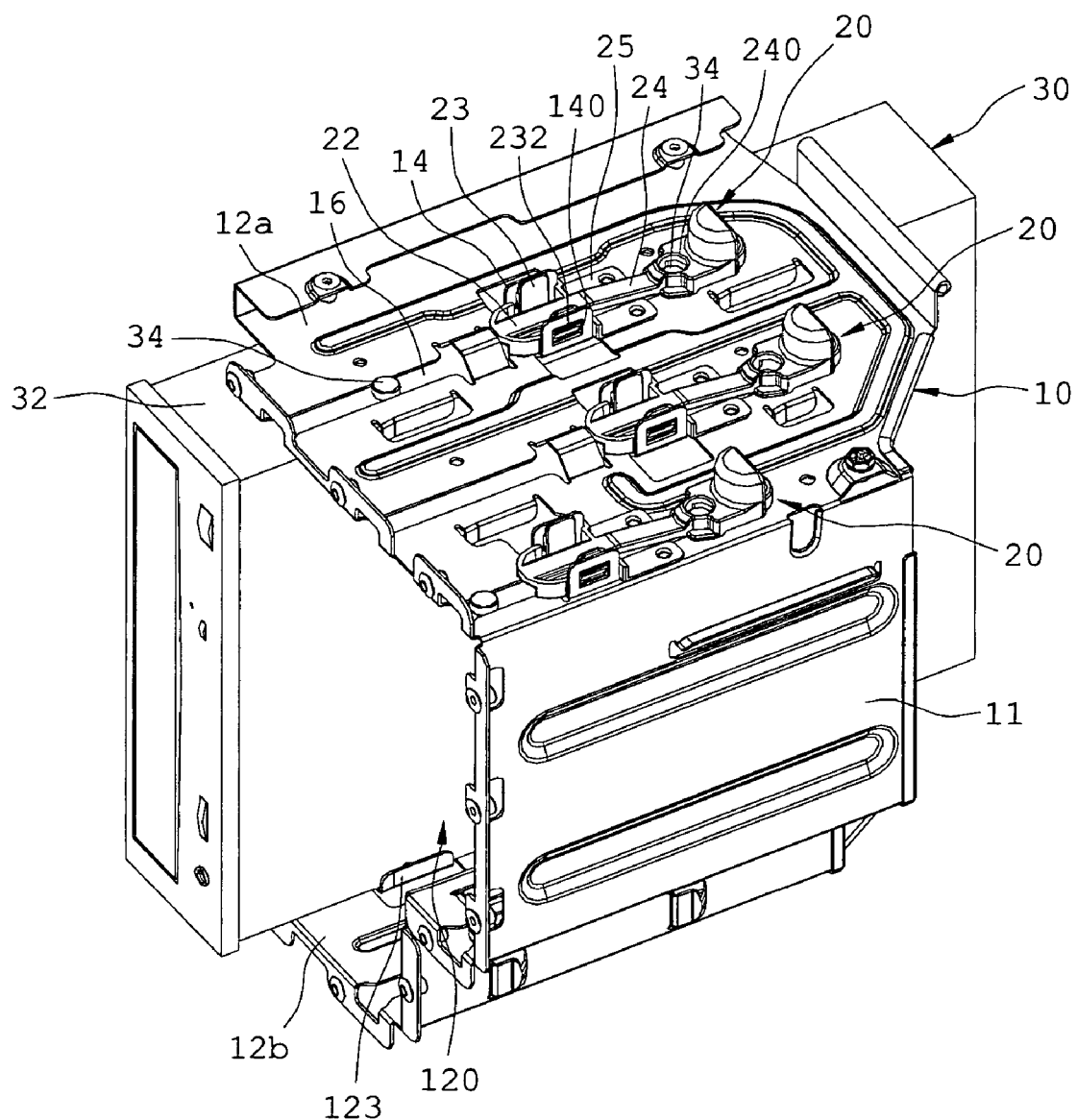
FIG. 2 is a perspective view of a first embodiment of a fixing mechanism for fixing a disc drive of the present invention.

Please refer to FIGS. 1 and 2, which are an exploded perspective view and a perspective view of a fixing mechanism for fixing a disc drive of first embodiment of according to the present invention, respectively. The present invention provides a fixing mechanism used to fix a disc drive 30. The disc drive 30 has a pair of side walls 32. A pair of protrusions 34 is located at one of the side walls 32. The fixing mechanism for fixing the disc drive includes a fixing frame 10 and a locking device 20.

As shown in FIG. 1, the fixing frame 10 is fixed in a housing 50. The fixing frame 10 includes a pair of assembling walls 12a and 12b and a side wall 11 (please refer to FIG. 2.). The pair of assembling walls 12a and 12b are adjacent to a side board 52 of the host housing 50. At least one receiving space 120 is formed between the pair of assembling walls 12a and 12b for receiving the disc drive 30. One of the assembling walls (12a) has a pair of assembling boards 14 protruding outward and an open sliding slot 16 formed between the pair of assembling boards 14. The protrusions 34 of the disc drive 30 are slidably installed in the sliding slot 16 and exposed out from the assembling wall 12a. The assembling wall 12a of the fixing frame 10 has at least one protruding bridge 18 that go across the sliding slot 16.

The locking device 20 is made of plastic material using an injection method, and has a base part 22 and a locking arm 24 extended from the base part 22. The two sides of the base part 22 are assembled to the pair of the assembling boards 14. The locking arm 24 is formed with a locking hole 240 at one free end thereof, which is engaged with one of the protrusions 34 of the disc drive 30.

In this embodiment, each of the side walls 32 of the disc drive 30 has a pair of protrusions 34. Each of the assembling walls 12a, 12b of the fixing frame 10 is formed with a sliding slot 16 (the lower sliding slot is not shown). The side walls 32 of the disc drive 30 are slidably installed into the sliding slots 16, respectively. However, the present invention is not limited to the above structure, the assembling wall 12b under the fixing frame 10 is used to restrict the lateral displacement of the disc drive 30, such as where a pair of guiding boards 123 are formed (as shown in FIG. 2).

Besides, the protrusion 34 of the disc drive 30 in this embodiment is a screw that is locked on the side wall 32. The sliding slot 16 has an open end 161 and a closed end 162 (as shown in the FIG. 1). When the disc drive 30 is installed, one of the protrusions 34 is against the closed end 162.

In this preferred embodiment, the base part 22 of the locking device 20 is respectively protruded with a wing board 23 at two sides thereof. Each wing board 23 is formed with an interference part 232 at the outside thereof, and each assembling board 14 of the fixing frame 10 is formed with an interference hole 140 corresponding to the interference part 232.

Please refer to FIG. 1. In order to make the locking device 20 more stable, the locking device 20 further includes a pair of positioning parts 25 that are respectively extended from the bottom of the wing boards 23 to the free end of the locking arm 24. Each of the positioning parts 25 have a positioning hole 250. The assembling wall 12a of the fixing frame 10 is protruded with a pair of positioning protrusions 122 corresponding to the positioning hole 250.

It is convenient to disassemble the disc drive with the fixing mechanism for fixing the disc drive of the present invention. The locking device 20 has a turning part 26 that extends upward from the free end of the locking arm 24. When the disc drive is assembled, the turning part 26 is turned upward to detach the disc drive 30. Then, the disc drive can be removed from the host housing 50 easily.

Figure 3:
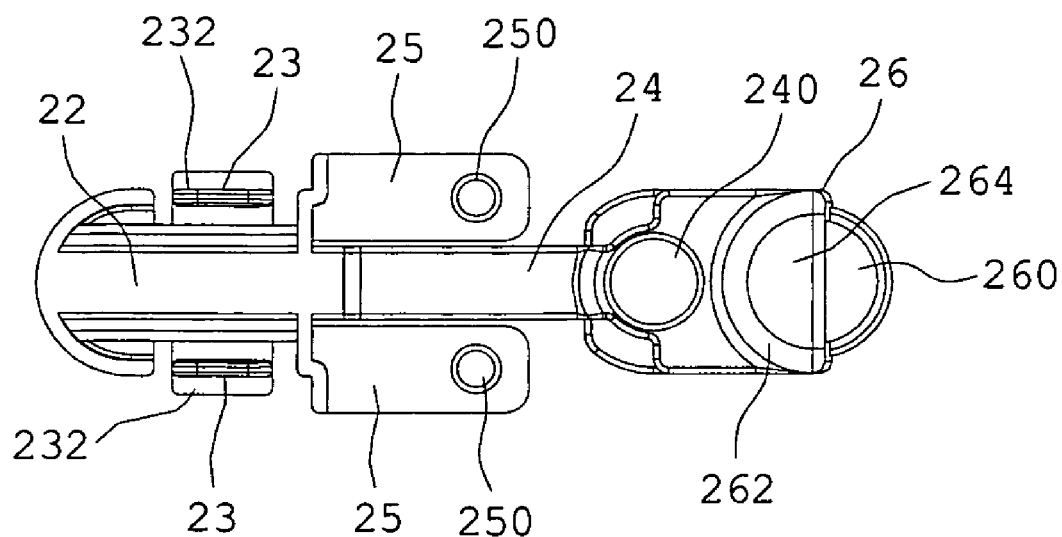
FIG. 3 is a top view of a locking device of the present invention.
Figure 4:
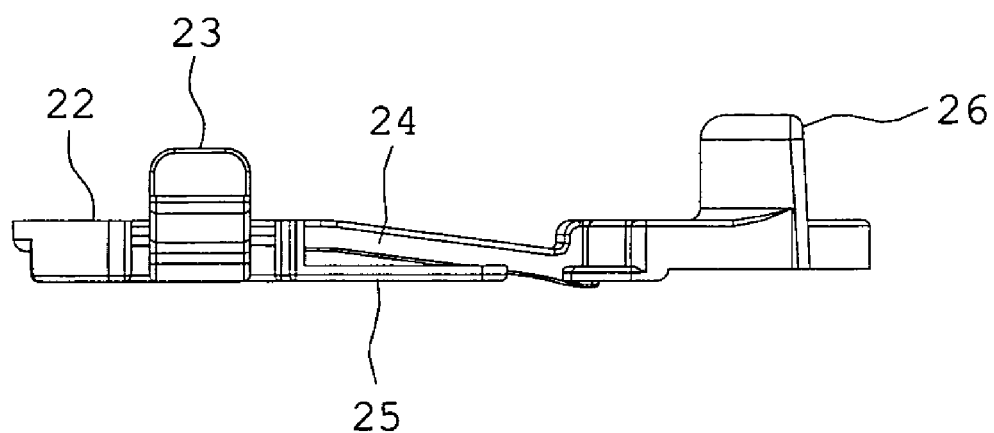
FIG. 4 is a side view of a locking device of the present invention.
Figure 6:
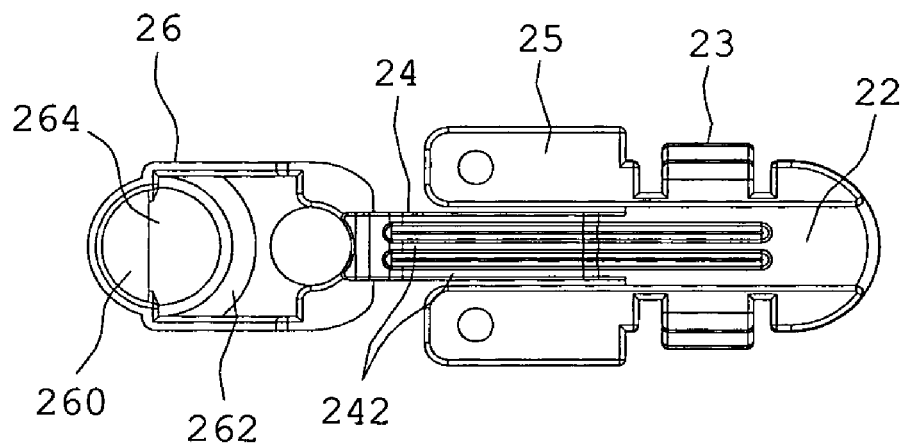
FIG. 6 is a bottom view of a locking device of the present invention.

Please refer to FIGS. 3, to 6, which are a top view, a side view, a perspective view and a bottom view of a locking device of the present invention, respectively. In the preferred embodiment, the turning part 26 is formed with a concave hole 260 at the bottom thereof, and the assembling wall 12a of the fixing frame 10 is formed with a protruding part 124. corresponding to the concave hole 260. (please refer to FIG. 1). Thereby, the locking arm 24 is locked firmly and restricts upward displacement.

Figure 5:
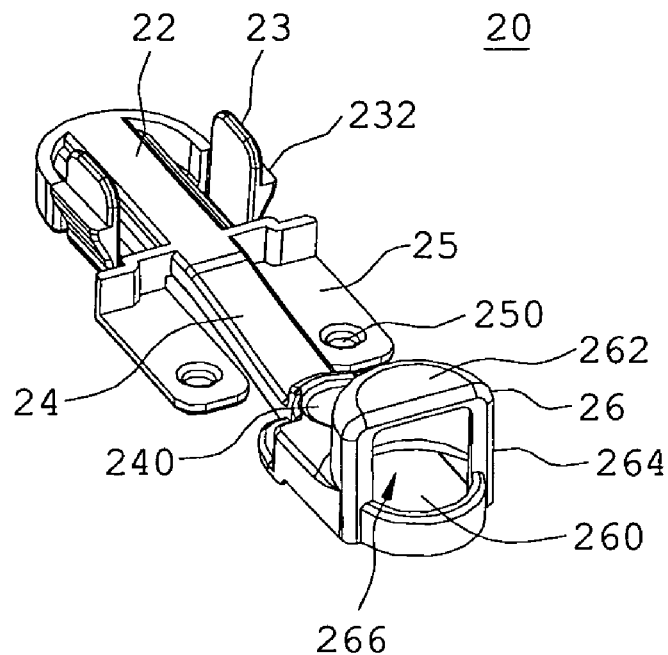
FIG. 5 is a perspective view of a locking device of the present invention.

In this embodiment, the turning part 26 is a semi-circular shell having an arc part 262 and a top part 264 located at the top of the arc part 262 to form forwardly a turning concave slot 266 (as shown in FIG. 5). Furthermore, the locking arm 24 is formed with a plurality of ribs 242 at the bottom thereof to strengthen the structural strength.

One thing is deserved to be mentioned, in this embodiment, the height of the turning part 26 is equivalent to the height between the assembling wall 12a of the fixing frame 10 and the outside plate 52 of the host housing 50 (as shown in FIG. 1). When the outside plate 52 of the host housing 50 is assembled to the host housing 50, the outside plate 52 is against the top of the turning part 26. The turning part 26 is pressed by the outside plate 52 to restrict the movement of the turning part 26. The present invention utilizes the outside plate 52 of the host housing 50 to restrict the moving space of the turning part 26 of the locking device 20 and prevent the turning part 26 from becoming loose when the computer is moved and causes the disc drive 30 to move out of the host housing 50.

Figure 7:
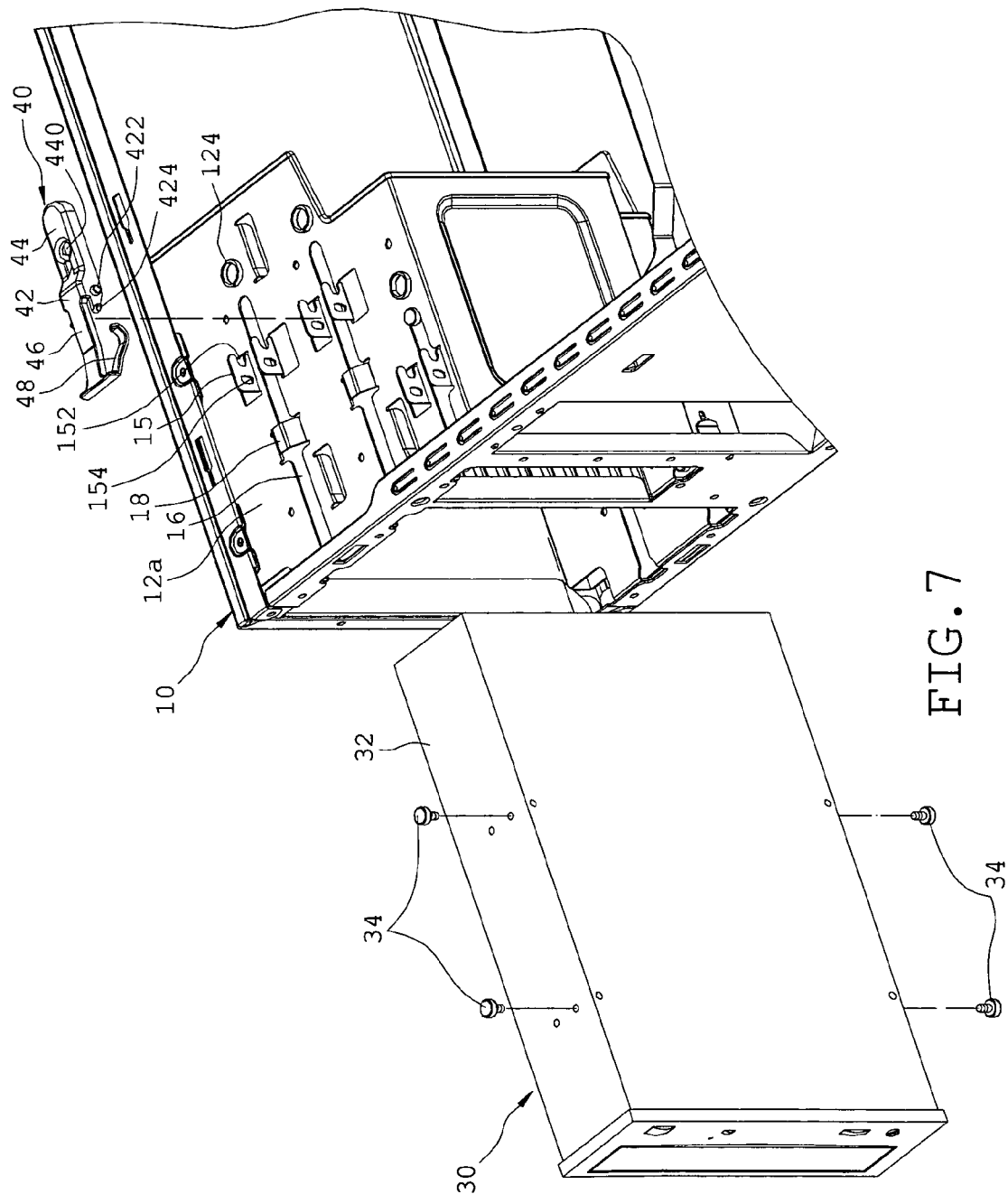
FIG. 7 is an exploded perspective view of a second embodiment of a fixing mechanism for fixing a disc drive of the present invention.
Figure 8:
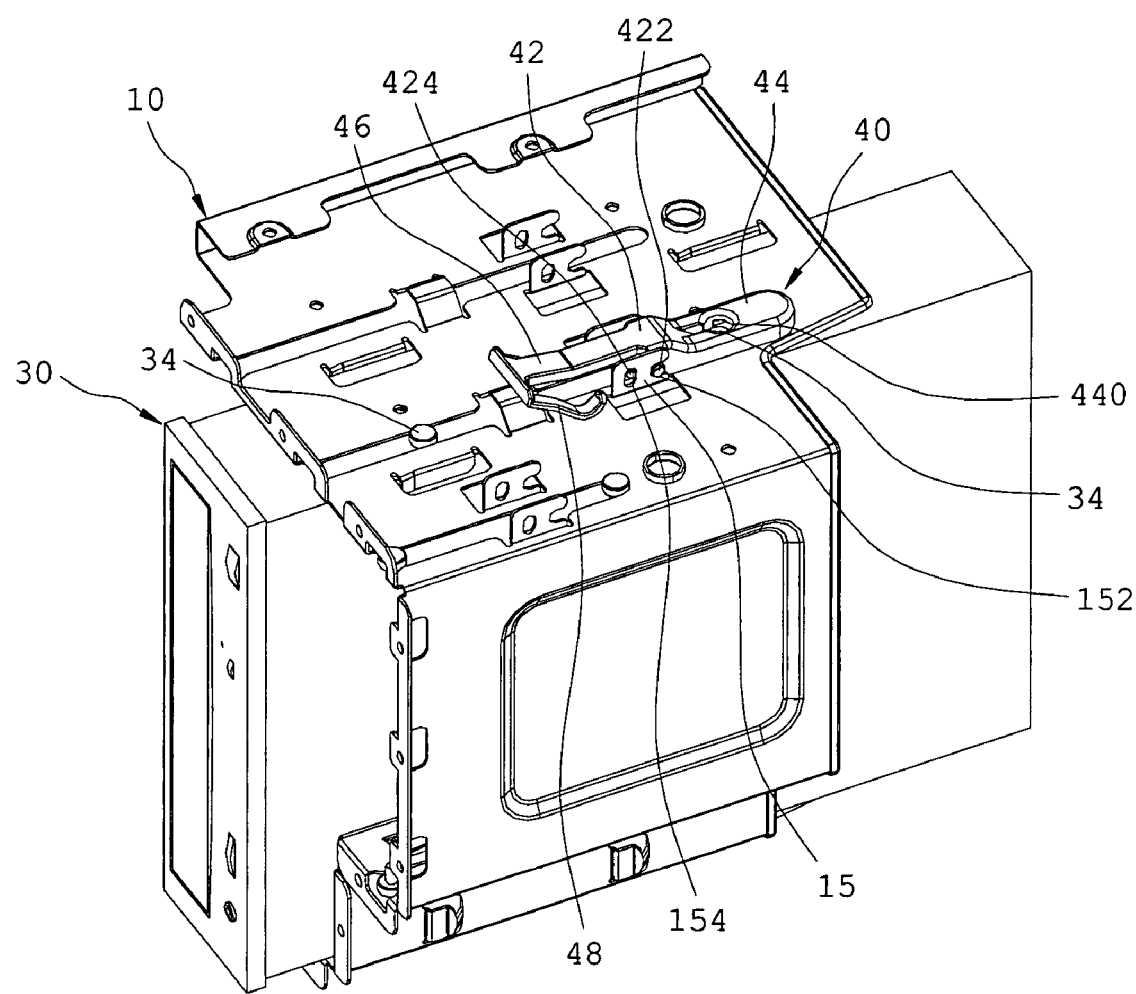
FIG. 8 is a perspective view of a second embodiment of a fixing mechanism for fixing a disc drive of the present invention.

Please refer to FIGS. 7 and 8, which are an exploded perspective view and a perspective view of a second embodiment of a fixing mechanism for fixing a disc drive of the present invention, respectively. The present embodiment provides a locking device 40 for a user to release the fixing status of the disc drive by a pressing method. The locking device 40 includes a base part 42 and a locking arm 44. The base part 42 protrudes with a pivot shaft 422 and a positioning shaft 424 at two sides thereof, respectively. The pivot shaft 422 is adjacent to the locking arm 44. Besides, the fixing frame 10 includes a pair of assembling boards 15, which are formed with a pivot joining slot 152 corresponding to the pivot shaft 422 and a loose joining hole 154 corresponding to the positioning shaft 424, respectively.

The locking device 40 includes an unlocking arm 46, which extends from the base part 42 and far away from the locking arm 44, and a flexible part 48, which extends downward from the free end of the unlocking arm 46. Alternatively, the flexible part 48 is extended from the base part 42 and far away from the locking arm 44, and is located at two sides of the unlocking arm 46, so that the flexible part 48 is against the assembling wall 12a of the fixing frame 10 (not shown in the figure).

Figure 9:
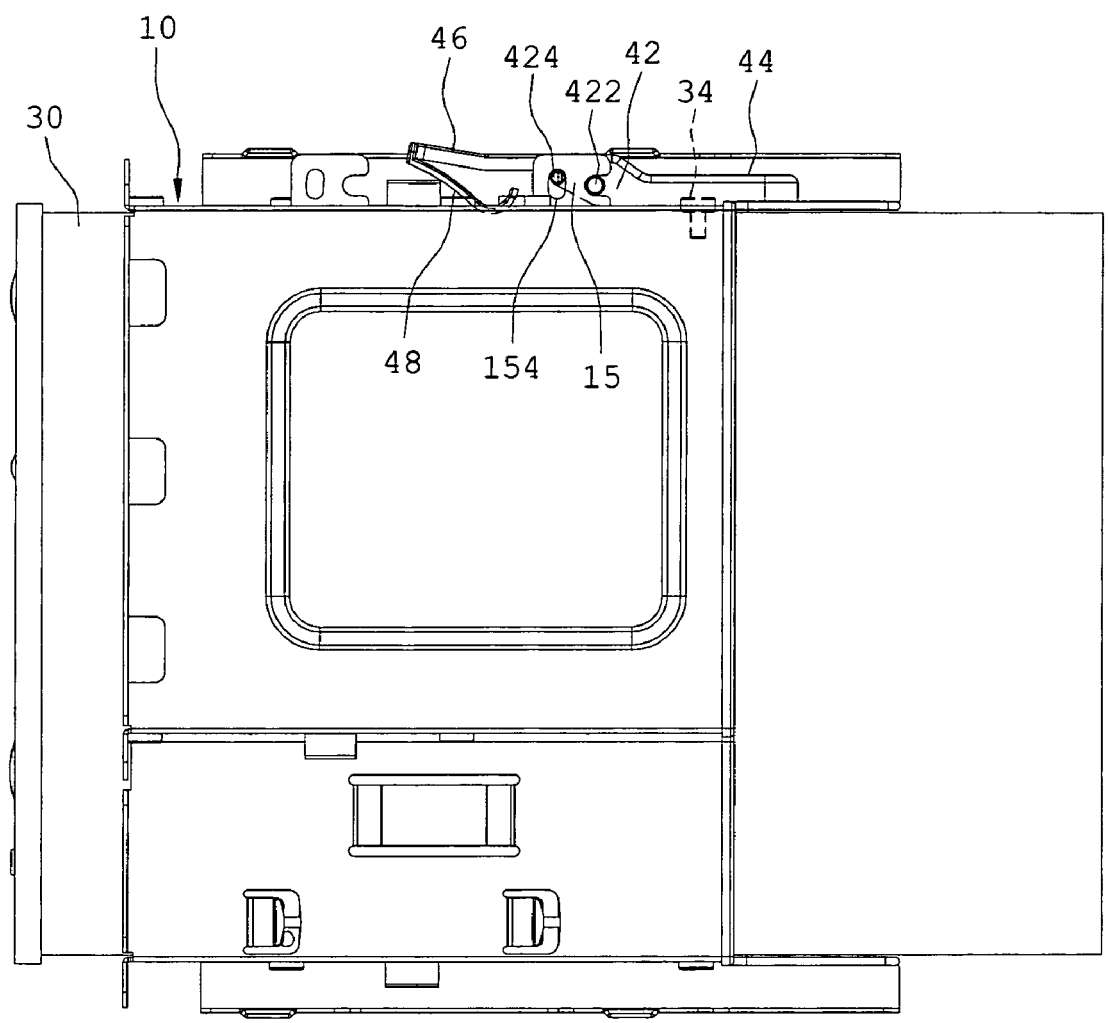
FIG. 9 is a side view of a second embodiment of a locking device of a fixing mechanism for fixing a disc drive of the present invention.

Please refer to FIG. 9, which is a side view of a second embodiment of a locking device of a fixing mechanism for fixing a disc drive of the present invention. In the second embodiment, when a user wants to release the disc drive from the locking status, the user just needs to press the unlocking arm 46. Then, the base part 42 rotates along the pivot shaft 422 and the locking arm 44 is lifted upward and separates from the protrusion 34 of the disc drive 30. Therefore, the disc drive 30 can be easily withdrawn. The position shaft 424 is moved within the loose joining hole 154 to restrict the up and down displacement of the unlocking arm 46.

Figure 10:
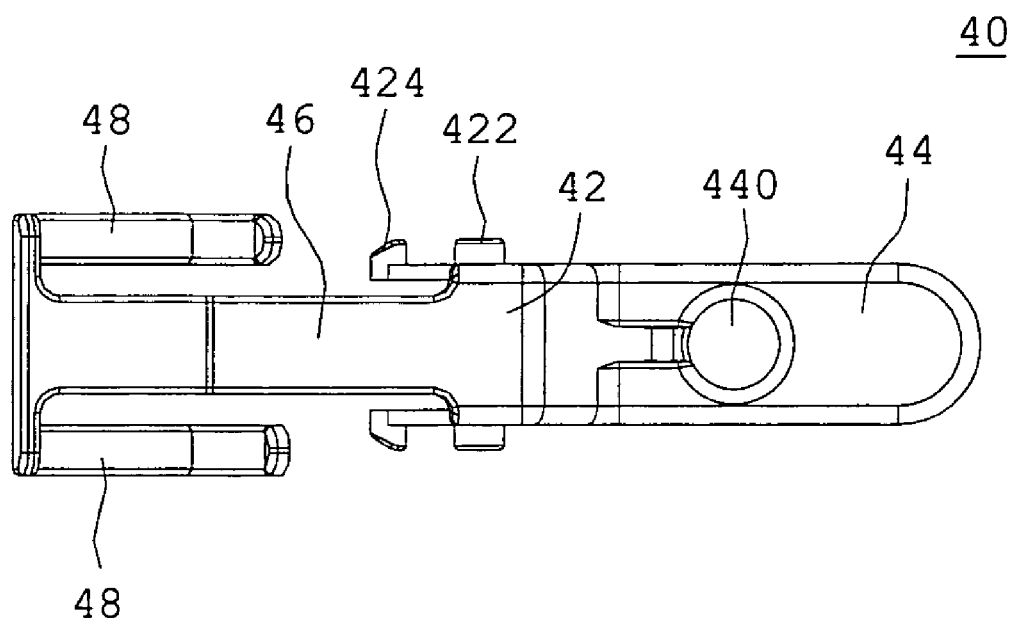
FIG. 10 is a top view of a second embodiment of a locking device of a fixing mechanism for fixing a disc drive of the present invention.
Figure 11:
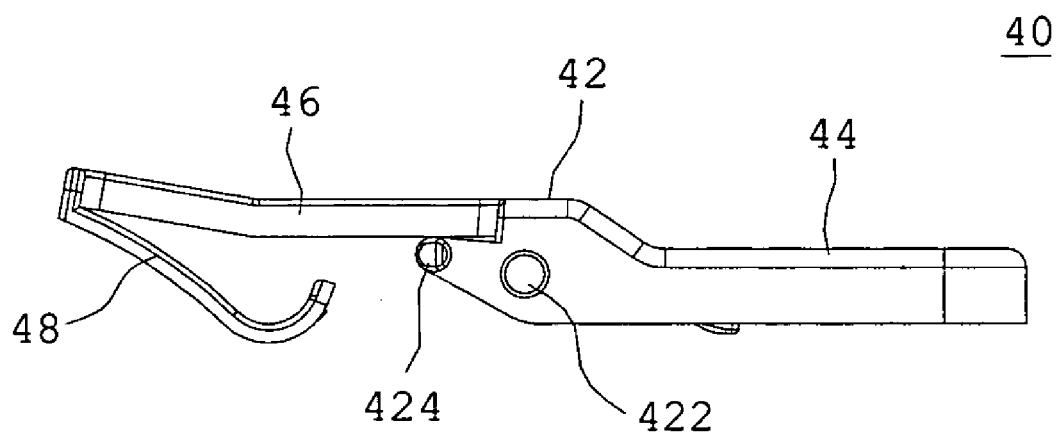
FIG. 11 is a side view of a second embodiment of a locking device of a fixing mechanism for fixing a disc drive of the present invention.
Figure 12:
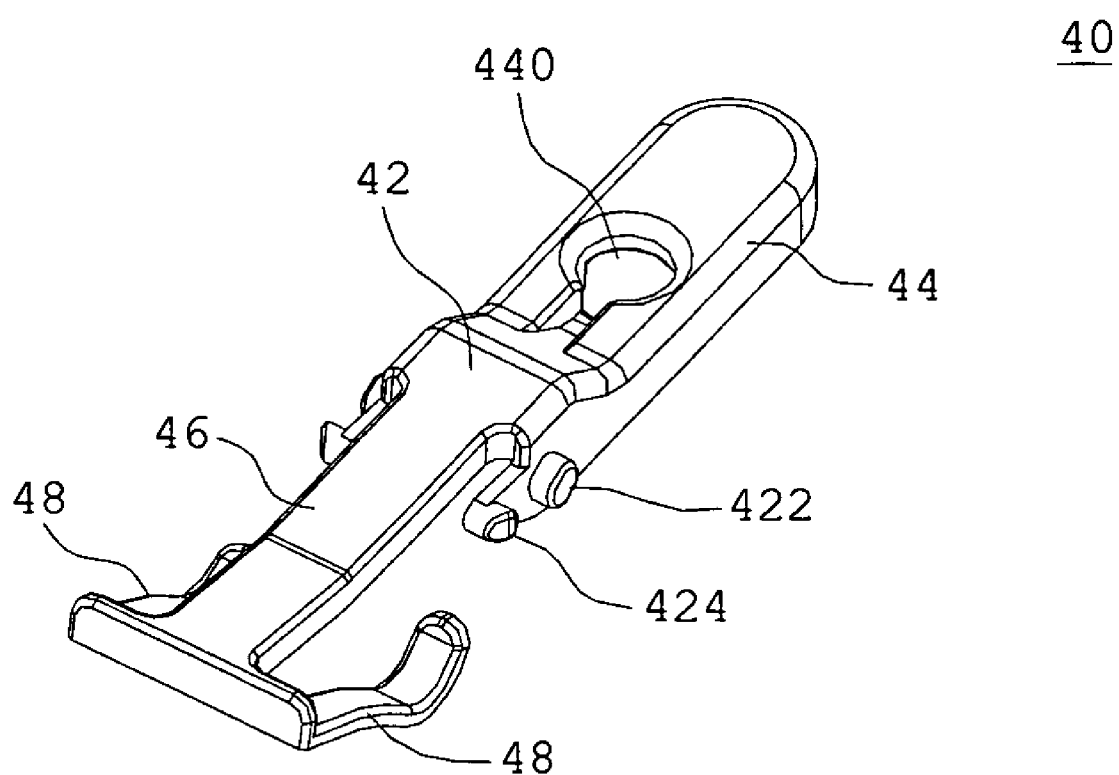
FIG. 12 is a perspective view of a second embodiment of a locking device of a fixing mechanism for fixing a disc drive of the present invention.

Please refer to FIGS. 10, 11 and 12, which show a top view, a side view and a perspective view of a second embodiment of a locking device of a fixing mechanism for fixing a disc drive of the present invention. In order to conveniently assemble the disc drive, the positioning shaft 424 includes an inclined plane (as shown in FIG. 10 and 12, but not numbered). In the present embodiment, the locking device 40 is installed along the assembling wall 12a of the fixing frame 10 and is laterally pushed into the pair of assembling boards 15.

The present invention has the following characteristics:

1. The fixing mechanism of the present invention allows the user to rapidly fix or disassemble the disc drive by turning or pressing the locking device without having to use any tools or screws. The prevent invention reduces the time needed for disassembling and fixing the disc drive. It is convenient for checking and repairing.

2. The locking device of the fixing mechanism of the present invention utilizes a clipping force produced from the flexibility of the plastic element and cooperates with the original structure to fix the disc drive. Furthermore, the locking device is easily mass-produced and its cost is lower.

3. The fixing mechanism of the present invention utilizes the host housing and the outside plate of the host housing to push and press the locking device. In this way, it prevents the locking device loosening from the host housing when the computer is moved.

The description above only illustrates specific embodiments and examples of the invention. The invention should therefore cover various modifications and variations made to the herein-described structure and operations of the invention, provided they fall within the scope of the invention as defined in the following appended claims.

What is claimed is:

1. A fixing mechanism for fixing a disc drive onto a host housing of computer, the disc drive having a pair of side walls and at least one pair of protrusions located at one of the side walls, comprising:

a fixing frame, fixed in the host housing, said fixing frame having a pair of assembling walls opposite each other to define at least one receiving space for receiving said disc drive, one of the assembling walls protruding outwardly with a pair of assembling boards and formed with an open sliding slot between said pair of assembling boards, said protrusions of said disc drive's slidably installed in said sliding slot and exposed out of the assembling walls; and a locking device, having a base part and a locking arm extended from said base part, two sides of the base part assembled to the pair of assembling boards, a locking hole formed at the free end of the locking arm and engaged with one of the protrusions of said disc drive.

2. The fixing mechanism for fixing a disc drive as claimed in claim 1, wherein said side walls of said disc drive respectively has a pair of protrusions, and the pair of assembling walls of the fixing frame respectively formed with a sliding slot, each of the pair of the side walls of the disc drive is slidably assembled in said pair of sliding slots.

3. The fixing mechanism for fixing a disc drive as claimed in claim 1, wherein said protrusion of said disc drive is a screw locked on said side wall of said disc drive.

4. The fixing mechanism for fixing a disc drive as claimed in claim 1, wherein said sliding slot has an open end and a closed end, and one of said protrusions is against said closed end when said disc drive is assembled.

5. The fixing mechanism for fixing a disc drive as claimed in claim 1, wherein said base part of said locking device protrude with a pair of wing boards from two sides thereof, respectively, and each of said wing boards is formed with an interference part at the outside thereof, and an interference hole is formed at each assembling board of said fixing frame corresponding to the interference part.

6. The fixing mechanism for fixing a disc drive as claimed in claim 5, wherein said locking device further comprises a pair of positioning parts respectively extended from the bottom of the wing boards to said free end of said locking arm, each of said positioning parts formed with a positioning hole, and said assembling wall of said fixing frame protrudes with a pair of positioning protrusions corresponding to said positioning hole.

7. The fixing mechanism for fixing a disc drive as claimed in claim 1, wherein said locking device includes a turning part extended upwardly from a free end of said locking arm.

8. The fixing mechanism for fixing a disc drive as claimed in claim 7, wherein said turning part is formed with a concave hole at a bottom thereof, and said assembling wall of the fixing frame is formed with a protruding part corresponding to said concave hole.

9. The fixing mechanism for fixing a disc drive as claimed in claim 7, wherein said turning part is a semi-circular shell having an arc part and a top part located at said top of said arc part to form a turning concave slot.

10. The fixing mechanism for fixing a disc drive as claimed in claim 7, wherein said height of said turning part is equivalent to that of between said assembling wall of said fixing frame and said outside plate of said host housing, when said outside plate of said host housing is assembled to said host housing, said outside plate is against a top of said turning part.

11. The fixing mechanism for fixing a disc drive as claimed in claim 1, wherein said base part respectively protrudes with a pivot shaft at two sides thereof adjacent said locking arm and a positioning shaft, each of the pair of assembling boards of said fixing frame includes a pivot joining slot corresponding to said pivot shaft and a loose joining hole corresponding to said positioning shaft.

12. The fixing mechanism for fixing a disc drive as claimed in claim 11, wherein said locking device includes an unlocking arm extended from said base part and far away from said locking arm, and a flexible part extended downward from a free end of said unlocking arm, said flexible part is against to said assembling wall of said fixing frame.

13. The fixing mechanism for fixing a disc drive as claimed in claim 11, wherein said positioning shaft includes an inclined plane.

14. A locking device of a fixing mechanism for fixing a disc drive in a fixing frame, comprising:

a base part fixed at said fixing frame;

a locking arm extending from said base part, a locking hole being formed at a bottom of a free end of said locking arm for locking said disc drive; and a turning part extending upward from the free end of said locking arm.

15. The locking device of a fixing mechanism for fixing a disc drive as claimed in claim 14, wherein said base part of said locking device includes wing boards respectively protruding from two sides thereof, and each of said wing boards is formed with an interference part at an outside thereof.

16. The locking device of a fixing mechanism for fixing a disc drive as claimed in claim 15, further comprising a pair of positioning parts respectively extending from a bottom of said wing boards to a free end of said locking arm and being positioned at said fixing frame.

17. The locking device of a fixing mechanism for fixing a disc drive as claimed in claim 14, wherein said turning part is a semi-circular shell having an arc part and a top part located at a top of said arc part to form a turning concave slot.

18. A locking device of a fixing mechanism for fixing a disc drive in a fixing frame, comprising:

a base part fixed at said fixing frame; and a locking arm extending from said base part, a locking hole being formed at a bottom of a free end of said locking arm for locking said disc drive, wherein said base part has two pivot shafts respectively protruding from two sides thereof adjacent to said locking arm, and two positioning shafts respectively protruding from two sides thereof.

19. The locking device of a fixing mechanism for fixing a disc drive as claimed in claim 18, further comprising:

an unlocking arm extending from said base part; and a flexible part that extending downward from a free end of said unlocking arm.

20. The locking device of a fixing mechanism for fixing a disc drive as claimed in claim 18, wherein each of said two positioning shafts includes an inclined plane.

* * * * *